United States Patent
Shargots et al.

(10) Patent No.: US 9,911,512 B2
(45) Date of Patent: Mar. 6, 2018

(54) CRDM INTERNAL ELECTRICAL CONNECTOR

(71) Applicant: BWXT mPower, Inc., Charlotte, NC (US)

(72) Inventors: Scott J Shargots, Forest, VA (US); Matthew W Ales, Forest, VA (US); Michael S Berthold, Holly Springs, NC (US)

(73) Assignee: BWXT mPower, Inc., Charlotte, NC (US)

( * ) Notice: Subject to any disclaimer, the term of this patent is extended or adjusted under 35 U.S.C. 154(b) by 863 days.

(21) Appl. No.: 13/863,611

(22) Filed: Apr. 16, 2013

(65) Prior Publication Data

US 2013/0301775 A1 Nov. 14, 2013

Related U.S. Application Data

(63) Continuation-in-part of application No. 13/405,405, filed on Feb. 27, 2012.
(Continued)

(51) Int. Cl.
*G21C 1/32* (2006.01)
*G21C 7/12* (2006.01)
(Continued)

(52) U.S. Cl.
CPC ............ *G21C 7/12* (2013.01); *G21C 7/16* (2013.01); *H05K 13/00* (2013.01); *G21C 1/32* (2013.01);
(Continued)

(58) Field of Classification Search
CPC .......... G21C 7/16; G21C 19/12; G21C 19/19; G21C 13/06; G21C 1/086; G21C 1/32; F15B 13/02
(Continued)

(56) References Cited

U.S. PATENT DOCUMENTS 3,162,579 A 12/1964 Thomas et al.
3,559,674 A 2/1971 Ostwald et al.
(Continued)

FOREIGN PATENT DOCUMENTS

CN 1040699 A 3/1990
CN 1080766 A 1/1994
(Continued)

OTHER PUBLICATIONS

International Search Report and Written Opinion for PCT/US2013/036856 dated Feb. 7, 2014.
(Continued)

*Primary Examiner* — Sharon M Davis
(74) *Attorney, Agent, or Firm* — Nelson Mullins Riley & Scarborough LLP

(57) ABSTRACT

An internal control rod drive mechanism (CRDM) including an electric motor is disposed in a nuclear reactor and further includes a support surface with sealed electrical connectors electrically connected with the electric motor power the motor. The internal CRDM is disposed on a support element secured inside the nuclear reactor. The support element includes sealed electrical connectors mating with the sealed electrical connectors on the support surface of the internal CRDM to power the electric motor. The sealed electrical connectors may be sealed glass, ceramic, or glass-ceramic connectors welded onto the ends of the MI cables extending from the motor. Springs, are disposed between the mating sealed electrical connectors of the support element and the support surface. A purge line is integrated with each mated connection.

10 Claims, 15 Drawing Sheets

Related U.S. Application Data

(60) Provisional application No. 61/625,484, filed on Apr. 17, 2012.

(51) Int. Cl.
*H05K 13/00* (2006.01)
*G21C 7/16* (2006.01)

(52) U.S. Cl.
CPC ......... *Y02E 30/39* (2013.01); *Y10T 29/49169* (2015.01)

(58) Field of Classification Search
USPC .................. 376/228, 230, 231, 353, 406
See application file for complete search history.

(56) References Cited

U.S. PATENT DOCUMENTS

| | | | |
|---|---|---|---|
| 3,844,882 A | 10/1974 | Bevilacqua et al. | |
| 3,940,311 A | 2/1976 | Frisch et al. | |
| 3,977,939 A | 8/1976 | Frisch et al. | |
| 4,029,897 A | 6/1977 | Mayer et al. | |
| 4,045,283 A | 8/1977 | Noyes et al. | |
| 4,054,186 A | 10/1977 | Banks, Jr. et al. | |
| 4,216,670 A | 8/1980 | Zintel et al. | |
| 4,302,034 A | 11/1981 | Weirich et al. | |
| 4,666,657 A | 5/1987 | Altman | |
| 4,857,264 A | 8/1989 | Veronesi et al. | |
| 4,863,678 A | 9/1989 | Shockling et al. | |
| 4,876,061 A | 10/1989 | Ekeroth et al. | |
| 4,888,151 A | 12/1989 | Gjertsen et al. | |
| 4,993,864 A | 2/1991 | Gjertsen et al. | |
| 5,022,100 A | 6/1991 | Belanger | |
| 5,025,834 A * | 6/1991 | Stoll .................... | B23Q 1/0009 137/271 |
| 5,051,103 A * | 9/1991 | Neuroth .............. | E21B 33/0385 439/192 |
| 5,064,607 A | 11/1991 | Miller et al. | |
| 5,094,268 A | 3/1992 | Morel et al. | |
| 5,141,711 A | 8/1992 | Gjertsen et al. | |
| 5,194,216 A | 3/1993 | McDaniels, Jr. | |
| 5,200,138 A | 4/1993 | Ferrari | |
| 5,217,596 A * | 6/1993 | Indig ................... | G01N 27/301 204/400 |
| 5,225,150 A | 7/1993 | Malandra et al. | |
| 5,227,125 A | 7/1993 | Beneck et al. | |
| 5,301,213 A * | 4/1994 | Linden .................. | G21C 19/00 285/381.2 |
| 5,361,279 A | 11/1994 | Kobsa et al. | |
| 5,586,155 A | 12/1996 | Erbes et al. | |
| 5,606,582 A | 2/1997 | Bergamaschi | |
| 5,625,657 A | 4/1997 | Gallacher | |
| 5,841,824 A | 11/1998 | Graham | |
| 6,091,790 A | 7/2000 | Ridolfo | |
| 6,236,699 B1 | 5/2001 | Ridolfo | |
| 6,421,405 B1 | 7/2002 | Ridolfo | |
| 6,484,806 B2 | 11/2002 | Childers et al. | |
| 7,412,021 B2 | 8/2008 | Fetterman et al. | |
| 2003/0157823 A1 * | 8/2003 | Morris ............... | H01R 13/5219 439/271 |
| 2007/0140877 A1 | 6/2007 | Sanville et al. | |
| 2007/0146480 A1 | 6/2007 | Judge, Jr. et al. | |
| 2008/0253496 A1 | 10/2008 | McCarty et al. | |
| 2009/0122946 A1 | 5/2009 | Fawcett et al. | |
| 2010/0316177 A1 | 12/2010 | Stambaugh et al. | |
| 2011/0222640 A1 | 9/2011 | Desantis | |

FOREIGN PATENT DOCUMENTS

| | | |
|---|---|---|
| CN | 1256497 A | 6/2000 |
| CN | 101154472 A | 4/2008 |
| CN | 103295653 A | 9/2013 |
| DE | 3631020 A1 | 3/1988 |
| WO | 2013162661 A1 | 10/2013 |
| WO | 2013188003 A2 | 12/2013 |

OTHER PUBLICATIONS

Development of In-vessel Type Control Rod Drive Mechanism for Marine Reactor, Ishida, et al., Journal of Nuclear Science and Technology, vol. 38, No. 7. Jul. 2001. pp. 557-570.

Non-Final Office Action for U.S. Appl. No. 13/405,405 dated Feb. 9, 2016.

European Search Report dated Mar. 17, 2016 for EP Application No. 13803559.7.

Office Action dated Mar. 4, 2016 for Chinese Application No. 201380022377.0.

Office Action dated May 5, 2016 for Chinese Application No. 201210472772.6.

Response to the Office Action dated Feb. 9, 2016 for U.S. Appl. No. 13/405,405.

Office Action dated Aug. 3, 2016 for U.S. Appl. No. 13/860,058.

Office Action dated Aug. 18, 2014 for U.S. Appl. No. 13/405,405.

Response to Office Action dated Aug. 18, 2014 for U.S. Appl. No. 13/405,405.

Final Office Action dated Apr. 14, 2015 for U.S. Appl. No. 13/405,405.

Response to the Final Office Action dated Apr. 14, 2015 for U.S. Appl. No. 13/405,405.

* cited by examiner

CRDM INTERNAL ELECTRICAL CONNECTOR

This application is a continuation-in-part of U.S. application Ser. No. 13/405,405 filed Feb. 27, 2012. U.S. application Ser. No. 13/405,405 filed Feb. 27, 2012 is hereby incorporated by reference in its entirety. This application claims the benefit of U.S. Provisional Application No. 61/625,484 filed Apr. 17, 2012. U.S. Provisional Application No. 61/625,484 filed Apr. 17, 2012 is hereby incorporated by reference in its entirety.

BACKGROUND

The following relates to the nuclear reactor arts, nuclear power generation arts, nuclear reactor control arts, nuclear reactor electrical power distribution arts, and related arts.

In nuclear reactor designs of the integral pressurized water reactor (integral PWR) type, a nuclear reactor core is immersed in primary coolant water at or near the bottom of a pressure vessel. In a typical design, the primary coolant is maintained in a subcooled liquid phase in a cylindrical pressure vessel that is mounted generally upright (that is, with its cylinder axis oriented vertically). A hollow cylindrical central riser is disposed concentrically inside the pressure vessel. Primary coolant flows upward through the reactor core where it is heated, rises through the central riser, discharges from the top of the central riser, and reverses direction to flow downward back toward the reactor core through a downcomer annulus.

The nuclear reactor core is built up from multiple fuel assemblies. Each fuel assembly includes a number of fuel rods. Control rods comprising neutron absorbing material are inserted into and lifted out of the reactor core to control core reactivity. The control rods are supported and guided through control rod guide tubes which are in turn supported by guide tube frames. In the integral PWR design, at least one steam generator is located inside the pressure vessel, typically in the downcomer annulus, and the pressurizer is located at the top of the pressure vessel, with a steam space at the top most point of the reactor. Alternatively an external pressurizer can be used to control reactor pressure.

A set of control rods is arranged as a control rod assembly that includes the control rods connected at their upper ends with a spider, and a connecting rod extending upward from the spider. The control rod assembly is raised or lowered to move the control rods out of or into the reactor core using a control rod drive mechanism (CRDM). In a typical CRDM configuration, an electrically driven motor selectively rotates a roller nut assembly or other threaded element that engages a lead screw that in turn connects with the connecting rod of the control rod assembly. The control rods are typically also configured to "SCRAM", by which it is meant that the control rods can be quickly released in an emergency so as to fall into the reactor core under force of gravity and quickly terminate the power-generating nuclear chain reaction. Toward this end, the roller nut assembly may be configured to be separable so as to release the control rod assembly and lead screw which then fall toward the core as a translating unit. In another configuration, the connection of the lead screw with the connecting rod is latched and SCRAM is performed by releasing the latch so that the control rod assembly falls toward the core while the lead screw remains engaged with the roller nut. See Stambaugh et al., "Control Rod Drive Mechanism for Nuclear Reactor", U.S. Pub. No. 2010/0316177 A1 published Dec. 16, 2010 which is incorporated herein by reference in its entirety; and DeSantis, "Control Rod Drive Mechanism for Nuclear Reactor", U.S. Pub. No. 2011/0222640 A1 published Sep. 15, 2011 which is incorporated herein by reference in its entirety.

The CRDMs are complex precision devices which require electrical power to drive the motor, and may also require hydraulic, pneumatic, or another source of power to overcome the passive SCRAM release mechanism (e.g., to hold the separable roller nut in the engaged position, or to maintain latching of the connecting rod latch) unless this is also electrically driven. In existing commercial nuclear power reactors, the CRDMs are located externally, i.e. outside of the pressure vessel, typically above the vessel in PWR designs, or below the reactor in boiling water reactor (BWR) designs. An external CRDM has the advantage of accessibility for maintenance and can be powered through external electrical and hydraulic connectors. However, the requisite mechanical penetrations into the pressure vessel present safety concerns. Additionally, in compact integral PWR designs, especially those employing an internal pressurizer, it may be difficult to configure the reactor design to allow for overhead external placement of the CRDMs. Accordingly, internal CRDM designs have been developed. See U.S. Pub. No. 2010/0316177 A1 and DeSantis, "Control Rod Drive Mechanism for Nuclear Reactor", U.S. Pub. No. 2011/0222640 A1 published Sep. 15, 2011 which is incorporated herein by reference in its entirety. However, placing the CRDMs internally to the reactor vessel requires structural support and complicates delivery of electrical and hydraulic power. Electrical conductors, which may be Mineral Insulated (MI) cable, that are usable inside the pressure vessel are generally not flexible and are not readily engaged or disengaged, or spliced, making installation and servicing of internal CRDM units time consuming and labor-intensive.

Disclosed herein are improvements that provide various benefits that will become apparent to the skilled artisan upon reading the following.

BRIEF SUMMARY

In some illustrative embodiments, an apparatus comprises: a nuclear reactor including a pressure vessel and a nuclear reactor core comprising fissile material disposed in the pressure vessel; an internal control rod drive mechanism (CRDM) including an electric motor disposed in the pressure vessel and a support surface including sealed electrical connectors electrically connected with the electric motor to deliver electrical power to the electrical motor; and a support element secured inside the pressure vessel on which the support surface of the internal CRDM is disposed to support the internal CRDM in the pressure vessel, the support element including sealed electrical connectors mating with the sealed electrical connectors on the support surface of the internal CRDM to deliver electrical power to the electric motor of the internal CRDM. In some embodiments the internal CRDM further comprises mineral insulated cables (MI cables) electrically connecting the electric motor to the sealed electrical connectors on the support surface, wherein each MI cable is connected to one of the sealed electrical connectors and the sealed electrical connectors are sealed glass connectors, sealed ceramic connectors, or sealed glass ceramic connectors. In some embodiments the sealed electrical connectors and the sealed electrical connectors are welded onto the ends of the MI cables. In some embodiments springs, e.g. wave springs, are disposed between the sealed electrical connectors of the support element and the mating sealed electrical connectors on the support surface of the internal CRDM. In some embodiments a purge line is integrated with each mated connection of a sealed electrical connector of the support element and the mated sealed electrical connector on the support surface of the internal CRDM. The internal CRDM may include a standoff mechanically secured with the internal CRDM, the support surface of the internal CRDM being a surface of the standoff. The support element may comprise a distribution plate including MI cables disposed on or in the distribution plate and terminating at the sealed electrical connectors of the distribution plate.

In some illustrative embodiments, a method comprises providing an internal control rod drive mechanism (CRDM) including an electric motor and a support surface including sealed electrical connectors electrically connected with the electric motor to deliver electrical power to the electrical motor, and installing the internal CRDM inside a nuclear reactor, the installing including placing the support surface of the internal CRDM onto a support element inside the nuclear reactor, the placing causing sealed electrical connectors disposed on the support element to mate with the sealed electrical connectors on the support surface of the internal CRDM. In such a method, the nuclear reactor may contain coolant water and the installing may be performed with the internal CRDM submerged in the coolant water—the seals of the sealed electrical connectors of the internal CRDM and the support element are effective to prevent coolant water ingress into the sealed electrical connectors. The method may further comprise, after the placing is performed, purging space between the mated sealed electrical connectors of the internal CRDM and the support element through a purge line using an inert gas. Still further, the method may comprise sealing off the purge line after the purging in order to trap residual inert gas in the space between the mated sealed electrical connectors of the internal CRDM and the support element.

In some illustrative embodiments, an internal control rod drive mechanism (CRDM) includes as a unitary assembly: an electric motor; a support surface; sealed glass, ceramic, or glass ceramic electrical connectors disposed on the support surface; and MI cables extending from the electric motor and having ends sealed inside the sealed glass, ceramic, or glass ceramic electrical connectors. The seals of the sealed glass, ceramic, or glass-ceramic electrical connectors are effective to allow the internal CRDM to be immersed in water without water ingress into the MI cables. Optionally, each sealed glass, ceramic, or glass-ceramic electrical connector further includes a purge line arranged to admit purge gas into space between the sealed glass, ceramic, or glass-ceramic electrical connector and an associated mating connector.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
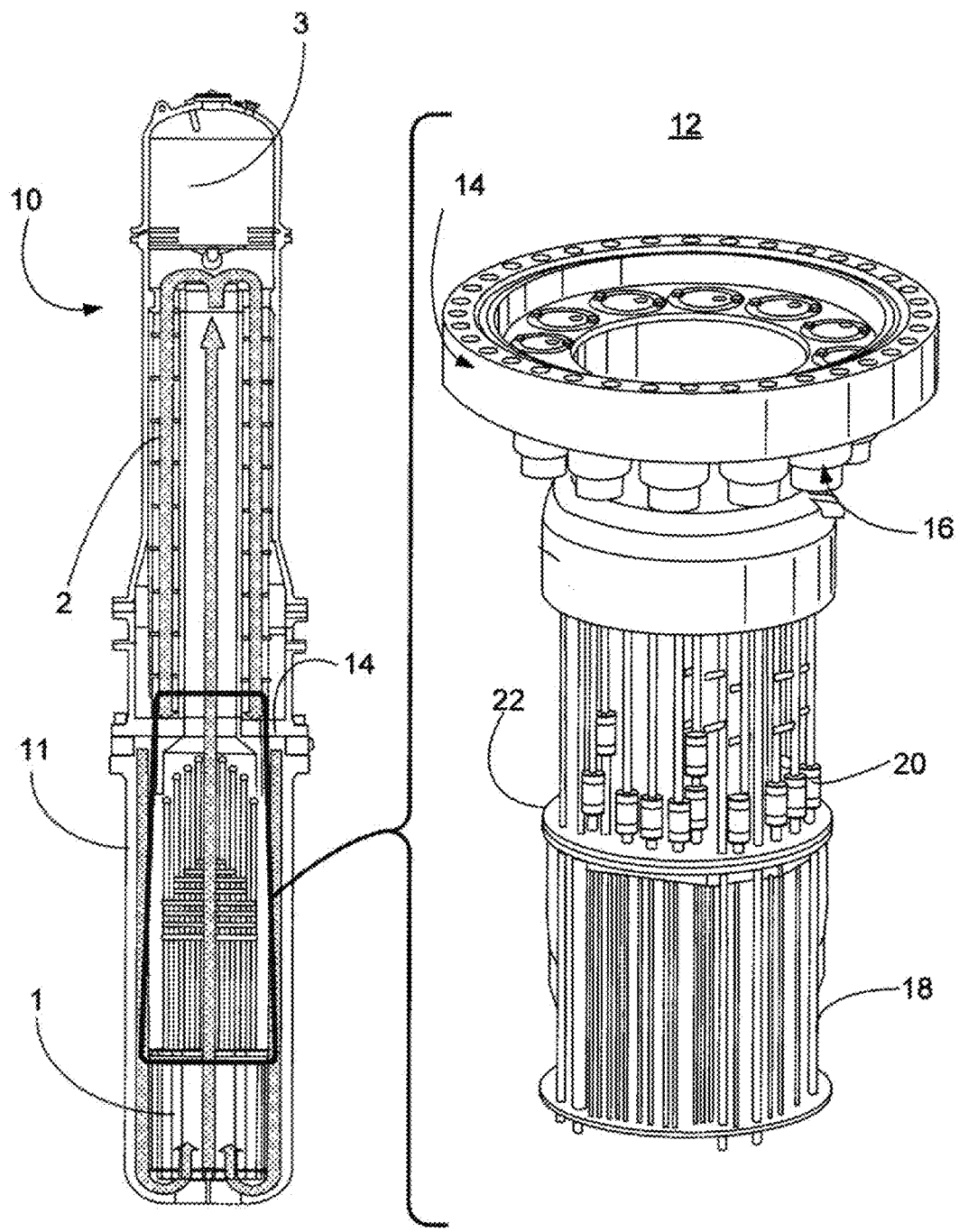
FIG. 1 diagrammatically shows an integral pressurized water reactor (integral PWR) with the upper internals of the reactor inset.

FIG. 1 illustrates an integral Pressurized Water Reactor (integral PWR) generally designated by the numeral 10. A reactor vessel 11 is generally cylindrical and contains a nuclear reactor core 1 comprising fissile material (e.g. $^{235}$U), steam generators 2, and a pressurizer 3. Although an integral pressurized water reactor (PWR) is depicted, embodiments utilizing a boiling water reactor (BWR), PWR with external steam generators, or other type of nuclear reactor are also contemplated. Moreover, while the disclosed rapid installation and servicing techniques are described with reference to illustrative internal CRDM units, these techniques are readily adapted for use with other internal nuclear reactor components such as internal reactor coolant pumps.

In the illustrative PWR, above the core 1 are reactor upper internals 12 of integral PWR 10, shown in inset. The upper internals 12 are supported laterally by a mid-flange 14, which in the illustrative embodiment also supports internal canned reactor coolant pumps (RCPs) 16. More generally, the RCPs may be external pumps or have other configurations, and the upper internals may be supported otherwise than by the illustrative mid flange 14. The upper internals include control rod guide frames 18 to house and guide the control rod assemblies for controlling the reactor. Control Rod Drive Mechanisms (CRDMs) 20 raise and lower the control rods to control the reactor. In accordance with one embodiment, a CRDM distribution plate 22 supports the CRDMs and provides power and hydraulics to the CRDMs.

Control rods are withdrawn from the core by CRDMs to provide enough positive reactivity to achieve criticality. The control rod guide tubes provide space for the rods and interconnecting spider to be raised upward away from the reactor core. The CRDMs 20 require electric power for the motors which move the rods, as well as for auxiliary electrical components such as rod position indicators and rod bottom sensors. In some designs, the force to latch the connecting rod to the lead screw, or to maintain engagement of the separable roller nut, is hydraulic, necessitating a hydraulic connection to the CRDM. To ensure passive safety, a positive force is usually required to prevent SCRAM, such that removal of the positive force initiates a SCRAM. The illustrative CRDM 20 is an internal CRDM, that is, is located inside the reactor vessel, and so the connection between the CRDM 20 and the distribution plate 22 is difficult to access. Servicing of a CRDM during a plant shutdown should preferably be rapid in order to minimize the length of the shutdown. To facilitate replacing a CRDM in the field, a standoff assembly connected to the distribution plate 22 to provide precise vertical placement of the CRDM 20 is also configured to provide electrical power and hydraulics to the CRDM 20 via connectors that require no action to effectuate the connection other than placement of the standoff assembly onto the distribution plate 22. After placement, the standoff is secured to the distribution plate by bolts or other fasteners. Additionally or alternatively, it is contemplated to rely upon the weight of the standoff assembly and CRDM to hold the assembly in place, or to use welds to secure the assembly.

The illustrative distribution plate 22 is a single plate that contains the electrical and hydraulic lines and also is strong enough to provide support to the CRDMs and upper internals without reinforcement. In another other embodiment, the distribution plate 22 may comprise a stack of two or more plates, for example a mid-hanger plate which provides structural strength and rigidity and an upper plate that contains electrical and/or hydraulic lines to the CRDMs via the standoff assembly.

The motor/roller nut assembly of the CRDM is generally located in the middle of the lead screw's travel path. When the control rod is fully inserted into the core, the roller nut is holding near the top of the lead screw, and, when the rod is at the top of the core, the roller nut is holding near the bottom of the lead screw and most of the length of the lead screw extends upward above the motor/roller nut assembly. Hence the distribution plate 22 that supports the CRDM is positioned "below" the CRDM units and a relatively short distance above the reactor core.

Figure 2:
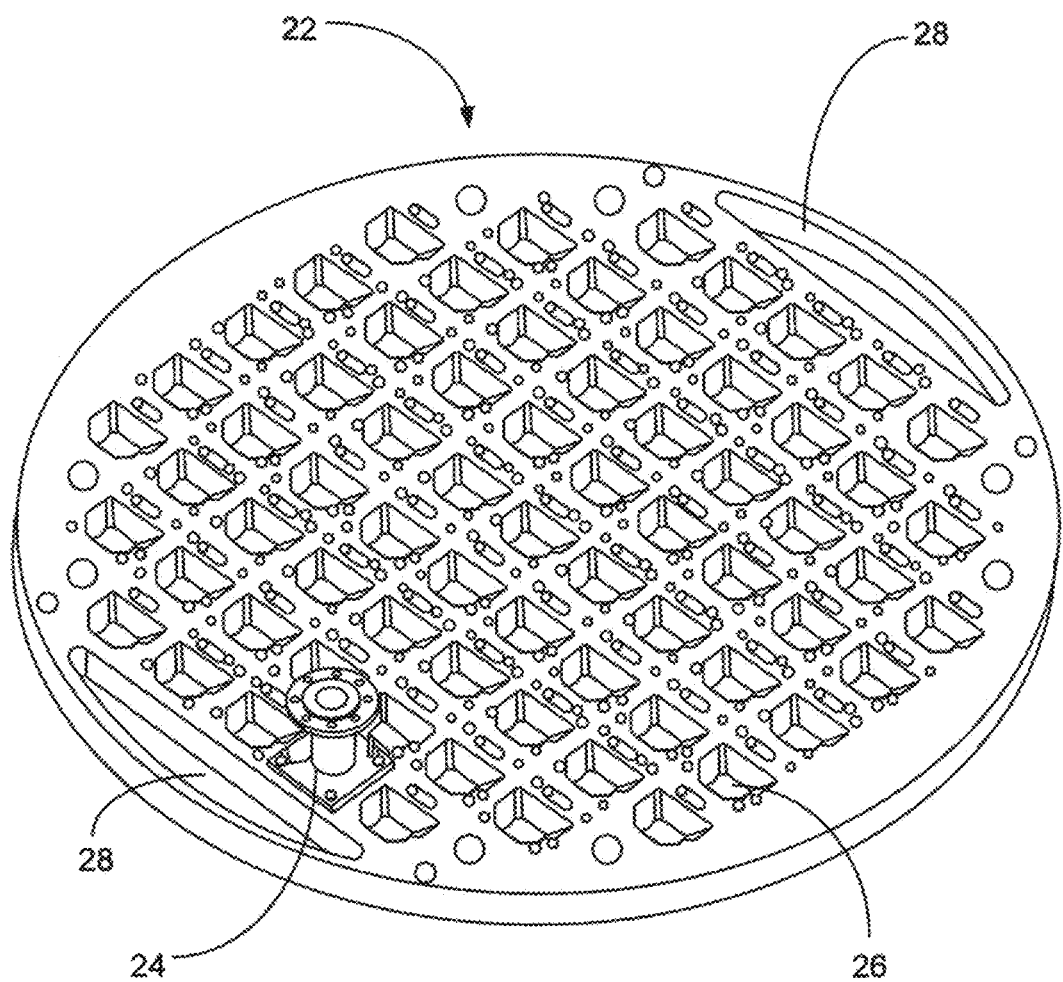
FIG. 2 shows a perspective view of a distribution plate suitably used in the upper internals of the integral PWR of FIG. 1.

FIG. 2 illustrates the distribution plate 22 with one standoff assembly 24 mounted for illustration, though it should be understood that most or all openings 26 would have a standoff assembly (and accompanying CRDM) mounted in place during operation of the reactor. Each opening 26 allows a lead screw of a control rod to pass through and the periphery of the opening provides a connection site for a standoff assembly that supports the CRDM. The lead screw passes down through the CRDM, through the standoff assembly, and then through the opening 26. The distribution plate 22 has, either internally embedded within the plate or mounted to it, electrical power lines (e.g., electrical conductors) and hydraulic power lines to supply the CRDM with power and hydraulics. The illustrative openings 26 are asymmetric or keyed so that the CRDM can only be mounted in one orientation. As illustrated, there are 69 openings arranged in nine rows to form a grid, but more or fewer could be used depending on the number of control rods in the reactor. The distribution plate is circular to fit the interior of the reactor, with openings 28 to allow for flow through the plate. In some designs, not all openings may have CRDMs mounted to them or have associated fuel assemblies.

The CRDMs are supported by the CRDM standoff assembly which is attached to a distribution plate that provides power to the CRDMs. The connectors for the CRDM's are integrated into the power distribution plate assembly and the CRDM standoff plate. They allow the disconnection of the power and signal leads when CRDM maintenance is required without splicing MI cable.

Figure 3:
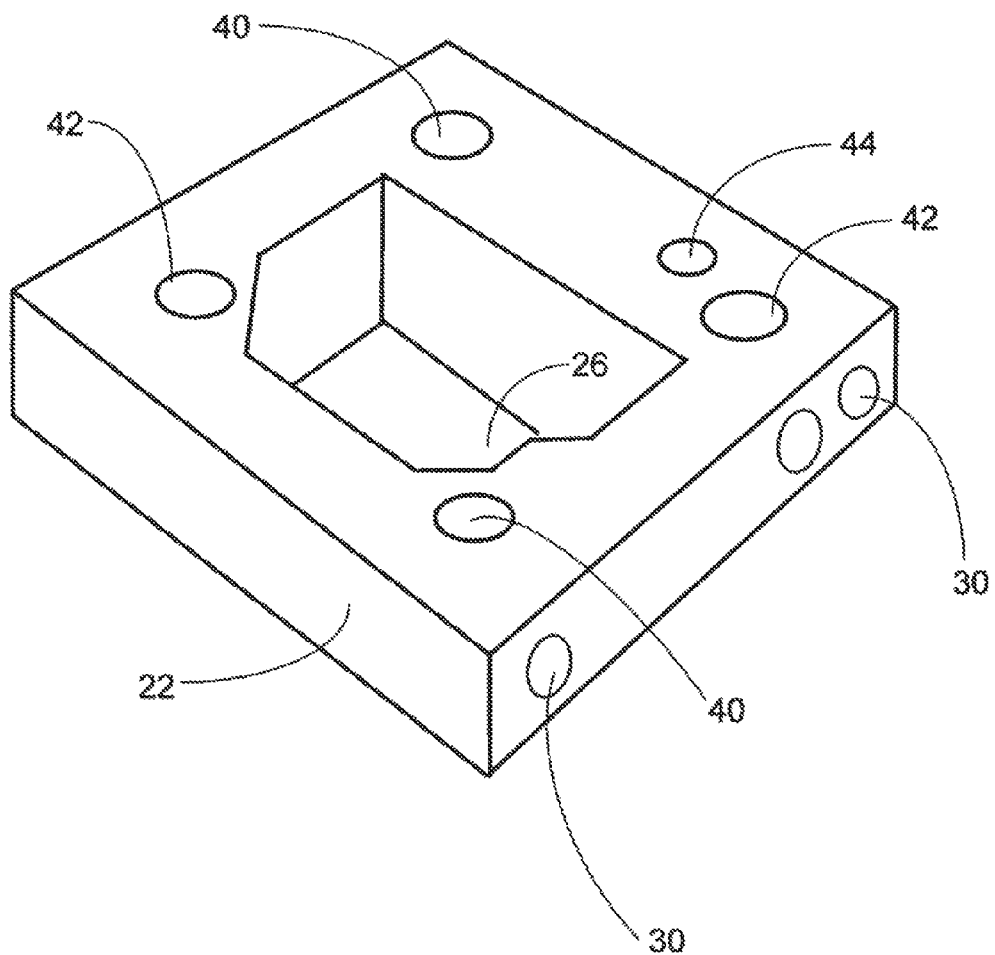
FIG. 3 is a detail of one of the openings of the distribution plate of FIG. 2.

FIG. 3 schematically illustrates a small cutaway view of one connection site of the distribution plate 22 for connecting a CRDM to the distribution plate. The connection site includes an opening 26 for passing the lead screw of a single CRDM. Located around the opening 26 are apertures 40 to accept bolts (more generally, other securing or fastening features may be used) and electrical connectors 42 for delivering electrical power to the CRDM. The illustrative CRDM employs hydraulic power to operate the SCRAM mechanism, and accordingly there is also a hydraulic connector 44 to accept a hydraulic line connection. The opening 26 and its associated features 40, 42, 44 create a connection site to accept the CRDM/standoff assembly. Internal to the distribution plate 22 may be junction boxes to electrically connect the connection sites to the electrical power lines running in between rows of connection sites. Similarly, the hydraulic connector 44 may connect to a common hydraulic line running through the distribution plate separated by depth.

Figure 4:
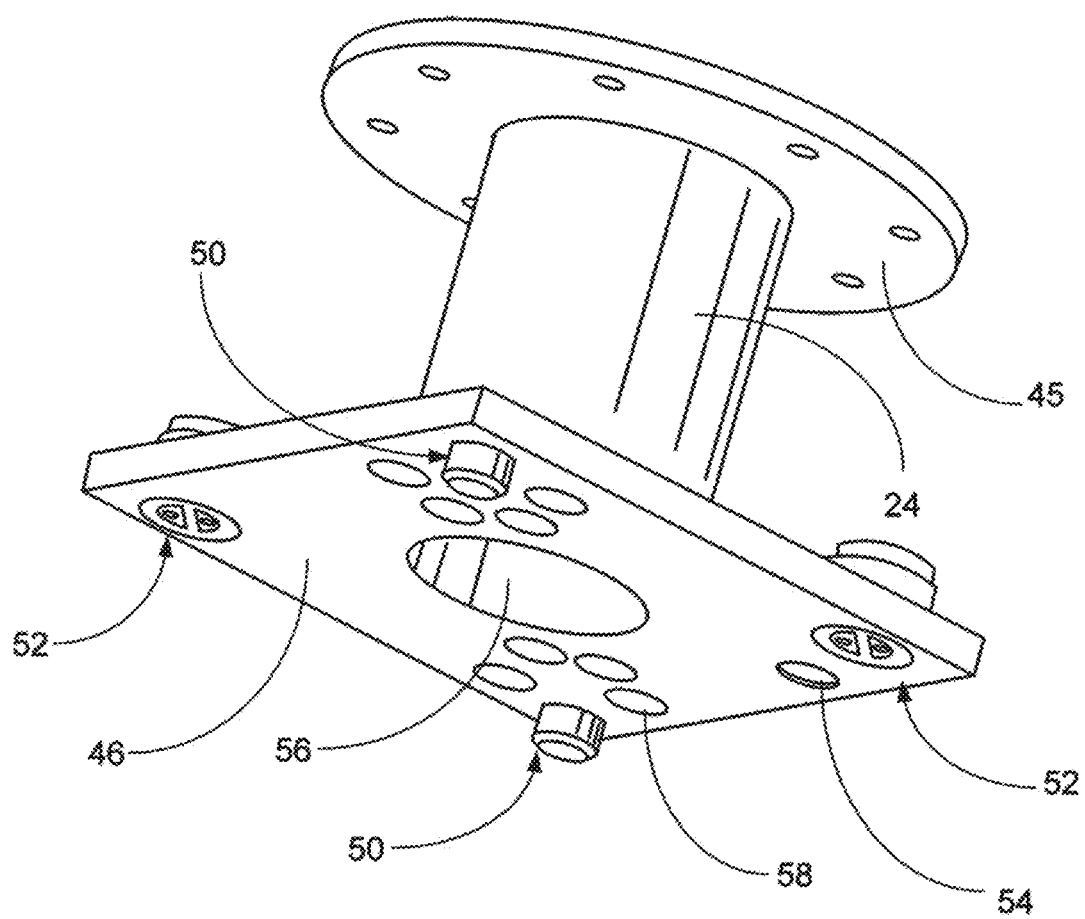
FIG. 4 illustrates a perspective view of a standoff assembly for mounting on the distribution plate of FIG. 2.

FIG. 4 illustrates a standoff 24 that suitably mates to opening 26 in the distribution plate 22. The standoff assembly has a cylindrical midsection with plates 45, 46 of larger cross-sectional area on either end of the midsection. The circular top plate 45 mates to and supports a CRDM 20. The square bottom plate 46 mates to the distribution plate 22. Although the illustrative bottom plate 46 is square, it may alternatively be round or have another shape. When the CRDM 20 and the top plate 45 of the standoff 24 are secured together they form a unitary CRDM/standoff assembly in which the bottom plate 46 is a flange for connecting the assembly to the distribution plate 22. Two bolt lead-ins 50 on diagonally opposite sides of the lower plate 46 mate to the apertures 40 of the distribution plate. The bolt lead-ins, being mainly for positioning the CRDM standoff, are the first component on the standoff to make contact with the distribution plate when the CRDM is being installed, ensuring proper alignment. Two electrical power connectors 52 on diagonally opposite corners of the bottom plate 46 mate to corresponding electrical power connectors 42 of the distribution plate 22. Each connector 52 is installed in a raised boss or collar 53 on the bottom plate 46 of the standoff 24 (e.g., see FIG. 5). A hydraulic line connector 54 on the bottom plate 46 mates to the corresponding hydraulic power connector 44 of the distribution plate 22. A central bore 56 of the standoff 24 aligns with the opening 26 of the distribution plate 22 and allows the lead screw to pass through. The connectors 42, 44 inside the distribution plate 22 (or connectors 52, 54 inside the standoff 24) optionally have internal springs to ensure positive contact, and the opposing bolts that attach at lead-ins 50 serve as tensioning devices to ensure proper seating of both the CRDM electrical connectors and hydraulic connectors. Illustrative flow slots 58 permit primary coolant to flow through the standoff.

Figure 5:
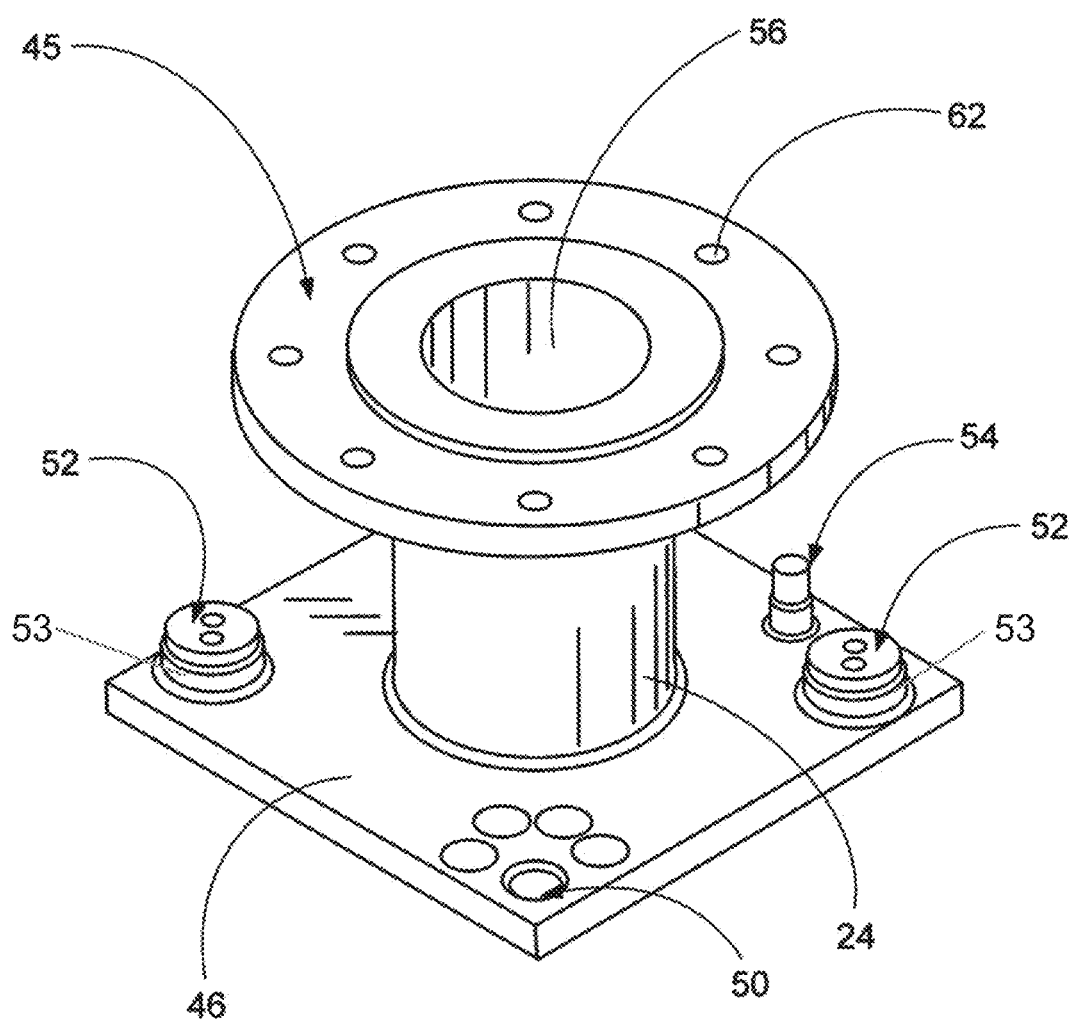
FIG. 5 illustrates a view of the standoff assembly of FIG. 4 from a different perspective.

FIG. 5 illustrates a perspective view focusing on the top plate 45 of the standoff 24. The top plate 45 of the standoff mates to the CRDM and is attached via bolt holes 62. Bolt holes 62 may be either threaded or unthreaded. The CRDM and standoff can be attached to each other and electrical connections 52 and hydraulic connection 54 made before the CRDM is installed so as to form a CRDM/standoff assembly having flange 46 for connecting the assembly with the connection site of the distribution plate 22. The bottom plate 46 of the standoff 24 is secured to the connection site via bolts passing through holes 50 and secured by nuts, threads in the bolt holes 40, or the like.

Figure 6:
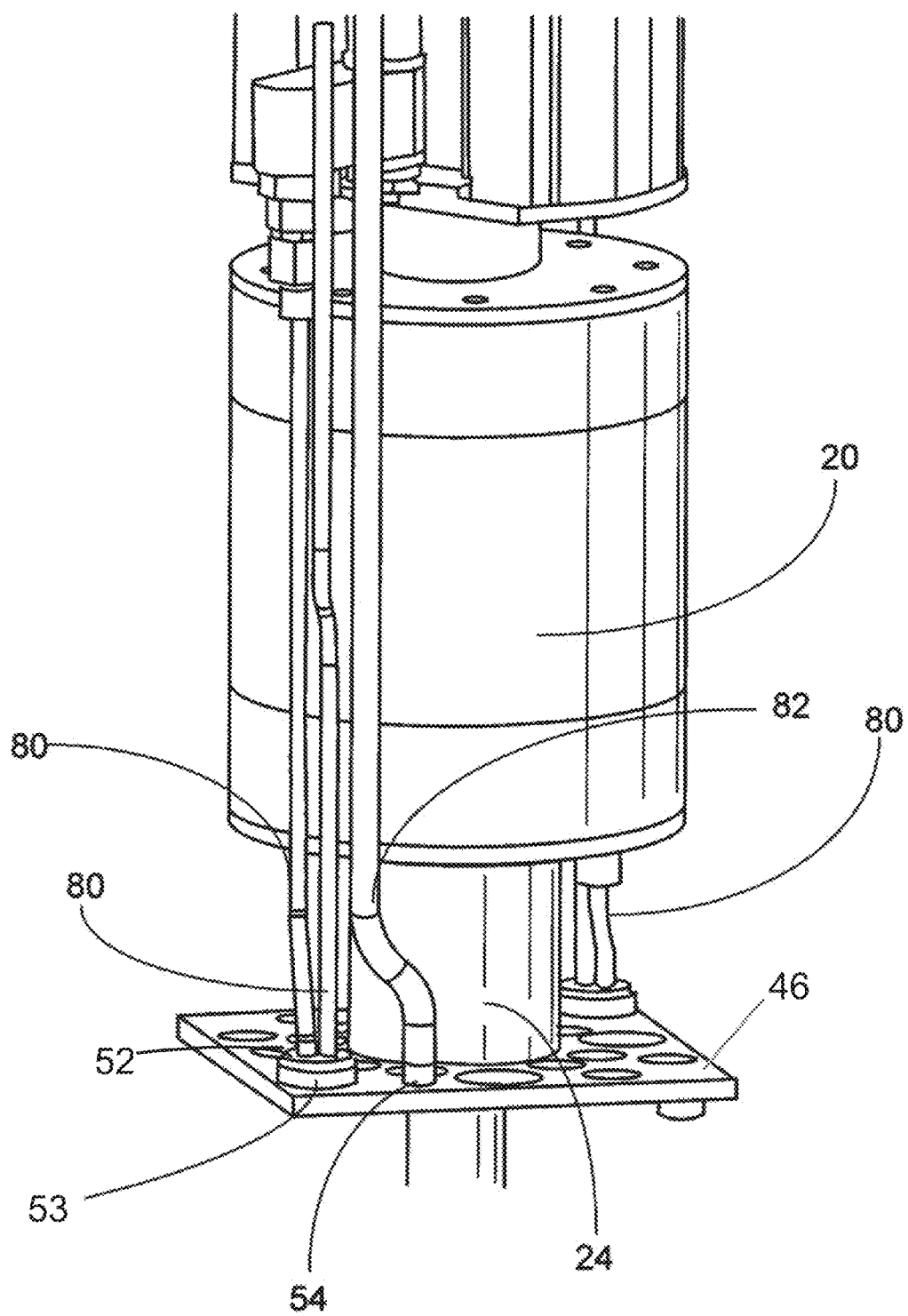
FIG. 6 illustrates the standoff assembly of FIGS. 4 and 5 connected to a Control Rod Drive Mechanism (CRDM) with associated electrical and hydraulic cabling.

FIG. 6 shows standoff 24 connected to a CRDM 20 to form a CRDM/standoff assembly that can be mounted to the distribution plate. CRDM electrical cabling 80 extends upward to conduct electrical power received at the electrical connectors 52 to the motor or other electrical component(s) of the CRDM 20. In the embodiment of FIG. 5, each electrical connector 52 terminates two electrical cables 80. Similarly, a CRDM hydraulic line 82 extends upward to conduct hydraulic power received at hydraulic connector 54 to the hydraulic piston or other hydraulic component(s) of the CRDM 20 to maintain latching—removal of the hydraulic power instigates a SCRAM. The entire assembly including the CRDM and the standoff is then installed as a unit on a distribution plate, simplifying the installation process of a CRDM in the field.

The interface points (i.e. CRDM electrical and hydraulic connectors) in the embodiment of FIG. 6 are at the standoff assembly but could be at any location along the length of the CRDM. For the illustrative examples, the interface point at which the CRDM is broken from the upper internals is at the bottom of the CRDM. The apparatus for which the interface points are located is the CRDM standoff and the CRDM power distribution plate.

In one embodiment, the electrical cables 80 are mineral insulated cables (MI cables) which generally include one, two, three, or more copper conductors wrapped in a mineral insulation such as Magnesium Oxide which is in turn sheathed in a metal. The mineral insulation could also be aluminum oxide, ceramic, or another electrically insulating material that is robust in the nuclear reactor environment. MI cables are often sheathed in alloys containing copper, but copper would corrode and have a negative effect on reactor chemistry. Some contemplated sheathing metals include various steel alloys containing nickel and/or chromium, or a copper sheath with a protective nickel cladding.

The electrical lines in the distribution plate 22 are also suitably MI cables, although other types of cabling can be used inside the distribution plate 22 if they are isolated by embedding in the plate. MI cables advantageously do not include plastic or other organic material and accordingly are well suited for use in the caustic high temperature environment inside the pressure vessel. The relatively rigid nature of the MI cables is also advantageous in that it helps ensure the integrity of the pre-assembled CRDM/standoff assembly during transport and installation. However, the rigidity of the MI cables limits their bending radius to relatively large radius turns, so that the MI cables inside the distribution plate 22 should be arranged as straight lines with only large-radius turns. The large area of the distribution plate 22, which spans a substantial portion of the inner diameter of the pressure vessel, facilitates a suitable arrangement of the MI cables inside the plate 22. Additionally, some types of MI cables are susceptible to degradation if the mineral insulation is exposed to water. Accordingly, the ends of the MI cables, e.g. at the coupling with the connector 52 in the standoff and the coupling of the power lines 30 with the electrical connectors 42 in the distribution plate 22, should be sealed against exposure to the primary coolant water. However, advantageously, the connectors 42, 52 themselves can be immersed in water. This makes installation, to be further described, readily performed even with the reactor core immersed in primary coolant.

Figure 7:
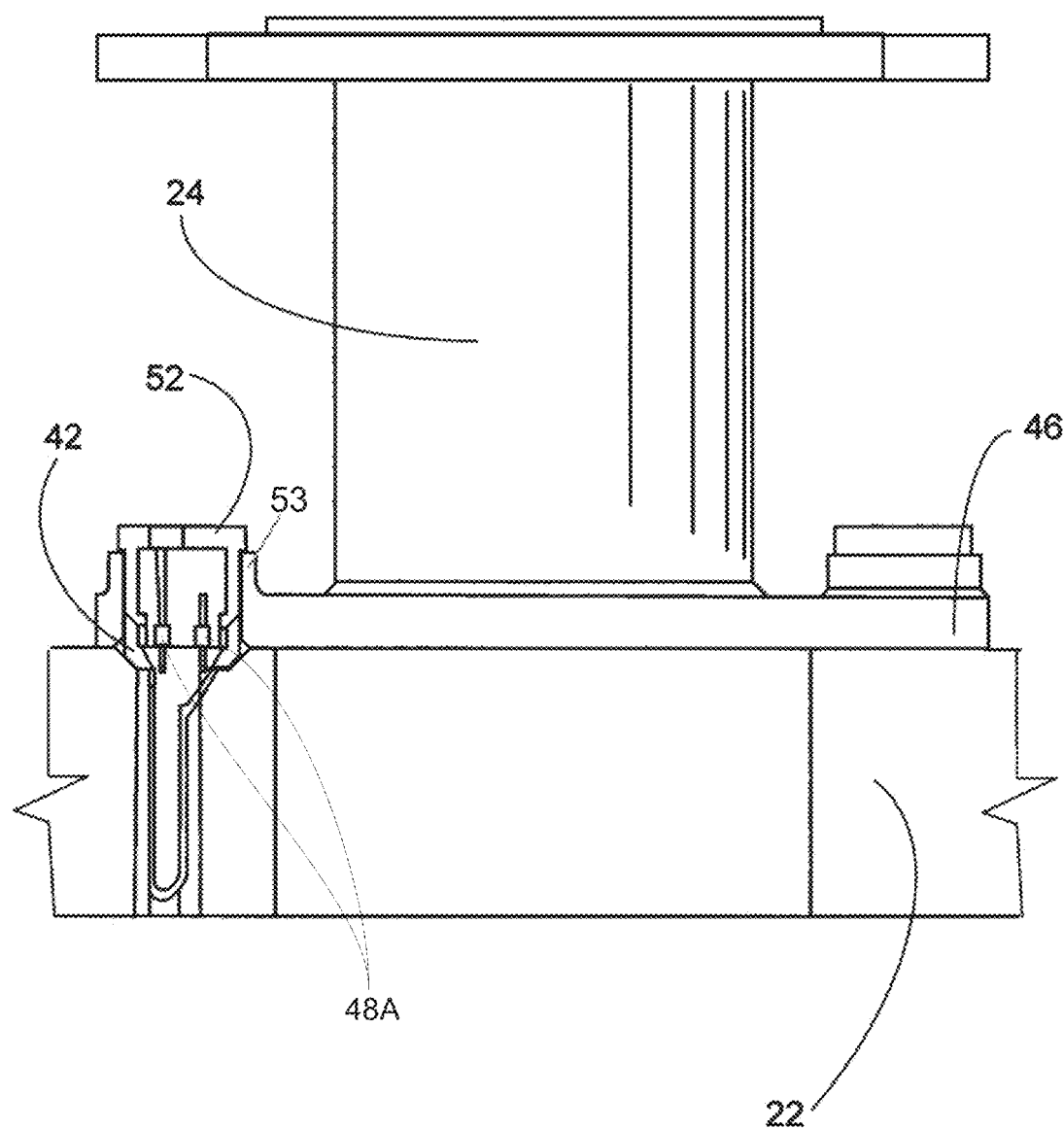
FIG. 7 is a cutaway view of an electrical connection between the standoff assembly and the distribution plate.

FIG. 7 shows the mating electrical connectors 42, 52 of the distribution plate 22 and CRDM/standoff assembly flange 46, respectively. The female electrical connector 52 (with sockets 48A) of the standoff assembly 24 lowers onto and covers the male electrical connector 42 of the distribution plate. The connectors 42, 52 preferably include glands or other features to prevent ingress of water to the mineral insulation of the MI cables 30, 80 at the junctions of these cables with the respective connectors 42, 52. For example, a glass seal or crushed metal seal may be employed. In this way, the connectors 42, 52 can be mated underwater without exposing the mineral insulation, so as to facilitate installing the CRDM/standoff assembly at the connection site of the distribution plate 22 while keeping the reactor core and the distribution plate 22 submerged in primary coolant. To ensure a good electrical connection, the connection between connectors 42, 52 can be purged to evacuate any trapped water. Alternatively, the electrical connectors could be mated and not purged, albeit typically with some increased resistance due to wet connectors.

The connector body has integrated features in both the receptacle and socket for the brazing of the MI cable directly to them. The connector body also has fill holes to allow for insulation packing after the MI cable is spliced to it. The receptacle housings weld-on base is designed such that the entrance angle of the MI cable can be adjusted for. The socket housing also has integrated purge lines for the insertion of the inert gas.

Alignment features are integrated into both the receptacle and socket that engage before the pin and sockets to ensure alignment and minimize stress. These alignment features optionally include a compliance feature such as a wave spring to help in allowing for multiple degrees of freedom with the sockets when mating.

Alternatively, an elastomer component can be used to drive water out of any voids instead of purging with an inert gas. Multiple MI cables can be routed to a single connector instead of a single connector feeding a single MI cable.

Figure 8:
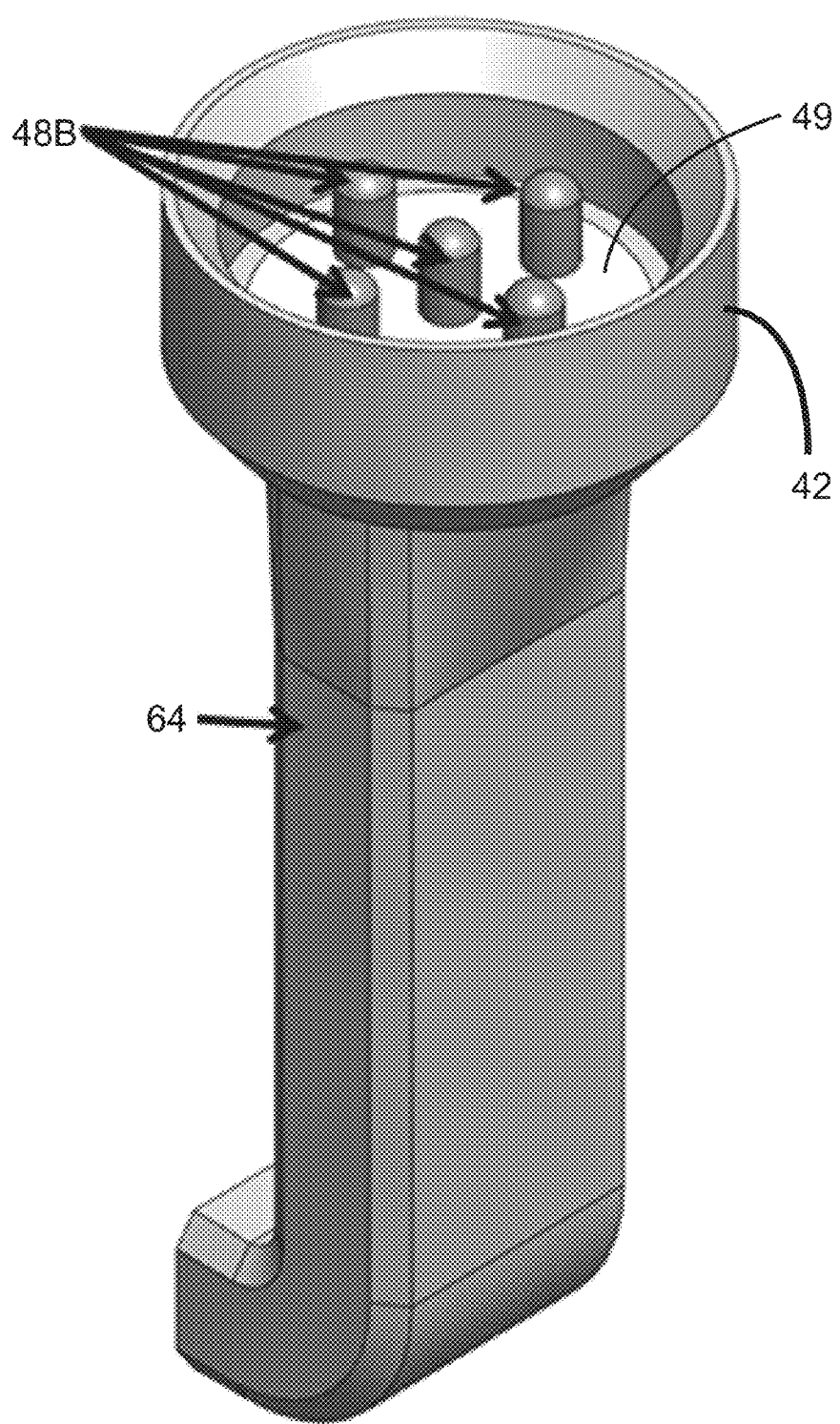
FIG. 8 is the male connector of FIG. 7 shown removed from the distribution plate.

FIG. 8 is an enlarged isolation perspective view of the connector 42 that is mounted in the distribution plate 22. Visible are the five male prongs 48B, which in some embodiments are gold-plated pins to reduce electrical contact resistance, penetrating a glass seal plate 49. The hermetically sealed connector formed by the prongs 48B and seal plate 49 may in general be a sealed glass connector, sealed ceramic connector, a sealed glass ceramic connector, or so forth. The connector has a trunk 64 that houses the splice or brazing to the MI cable.

Figure 9:
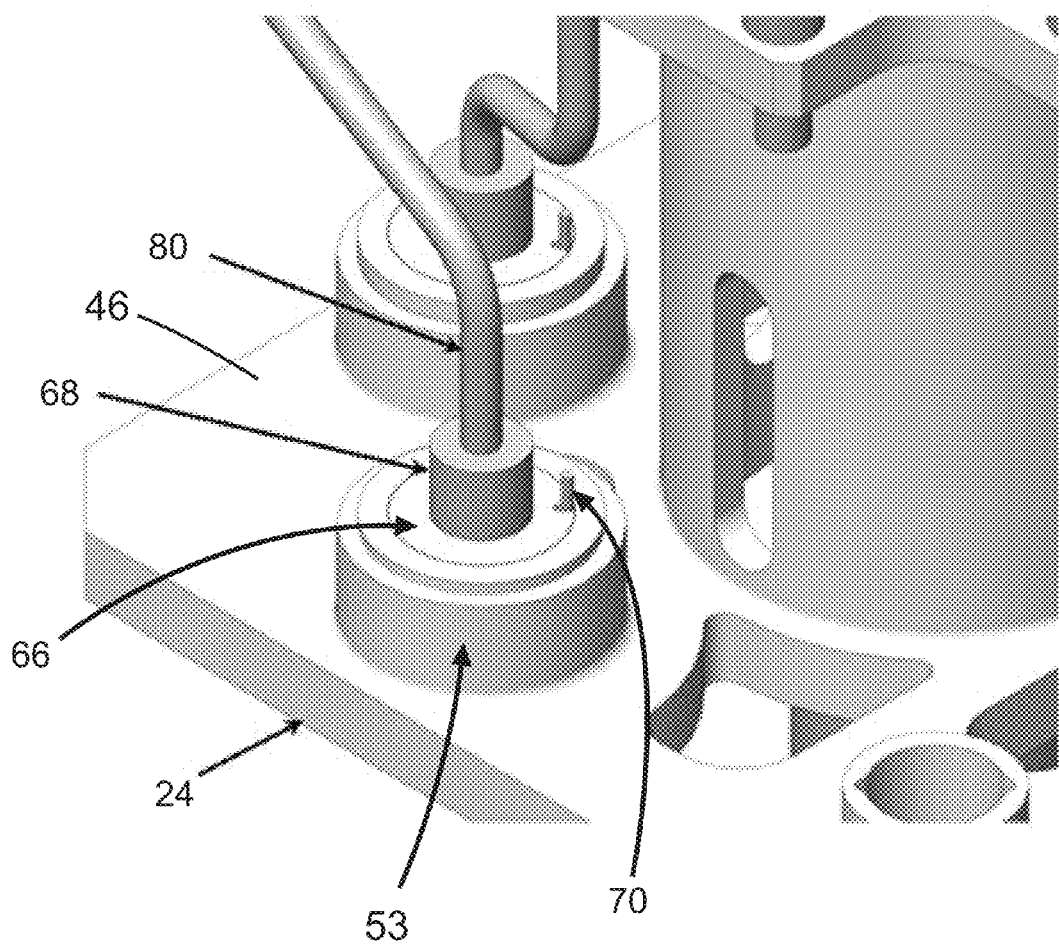
FIG. 9 is an alternative embodiment of the connector shown installed in the standoff assembly of FIGS. 4 and 5.

FIG. 9 shows an alternative embodiment of the connector. The connector 66 corresponds to the connector 52 of the earlier embodiment, but terminates a single MI cable 80. Connector 66 has a purge line 70 to pump in an inert gas such as nitrogen or argon to evacuate any liquid when mating to connector 67. MI cable 80 is connected to connector 66 via a splicing sleeve 68. The purge line 70 may be alternatively located on the lower connector.

Figure 10:
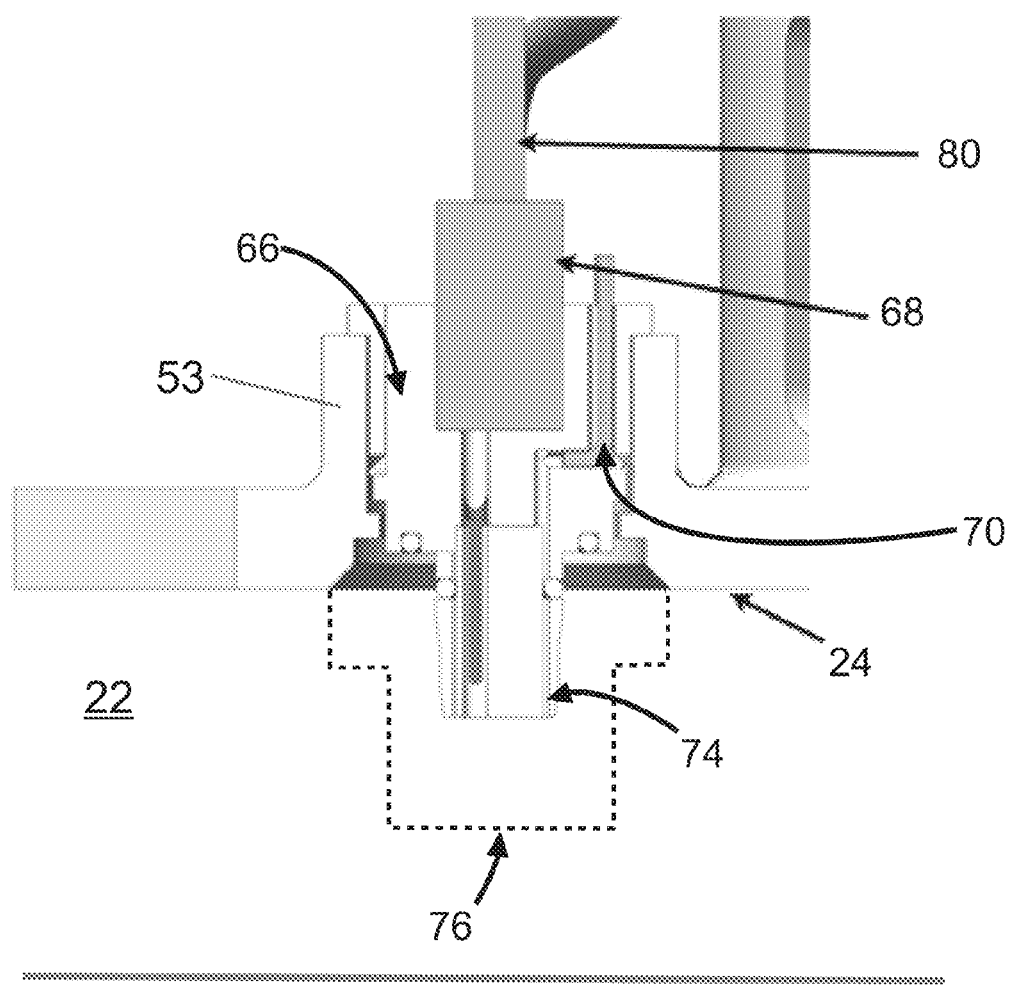
FIG. 10 is a cutaway of the connector of FIG. 9.

FIG. 10 shows a connector 66 installed in the boss or collar 53 in cutaway. Purge line 70 runs into the area between the connectors, allowing the connection to be purged of fluid. The external connection to the purge line 70 optionally comprises a self-sealing connector or other mechanism enabling the purge line 70 to be sealed off after purging so as to trap residual purge gas in the space between the connectors and prevent water ingress after the purging. The female connector 76 mounted in the distribution plate 22 corresponds to the connector 42 of the previous embodiment. Connector 66 on the standoff has a male extension 74 extending from the connector 66 down into the female connector 76 to make the mating.

Figure 12:
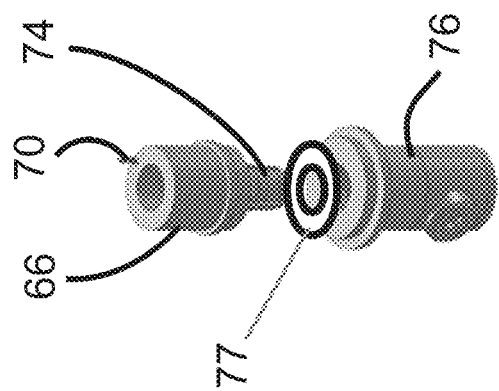
FIGS. 11 and 12 show exploded and assembled perspective views, respectively, of connectors of FIGS. 9 and 10.
Figure 11:
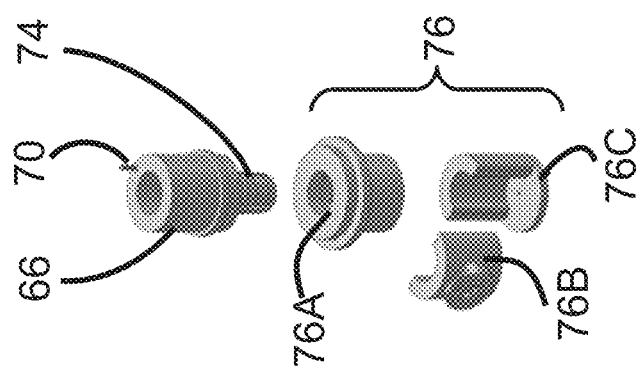

FIGS. 11 and 12 show exploded and assembled perspective isolation views, respectively, of the connectors 66 and 76 of the standoff assembly and distribution plate, respectively. The extending portion 74 of the connector 66 extends down into connector 76. Connector 76 is formed of three parts: a top part 76A, a MI cable weld prep part 76B, and an adjustable weld-on base 76C. The top part 76A receives connector extension 74. The MI cable weld prep portion 76B receives the MI cable and allows the cable to be welded in place. The adjustable weld on base is welded into place, protecting the junction of the MI cable conductors to the top portion. Instead of or in addition to a welded metallic seal, other sealing configurations such as a glass-to-metal seal or a crushed metal seal may be employed. FIG. 12 also illustrates a wave spring 77 optionally used to provide compliance when connecting the connectors 66, 76.

Figure 13:
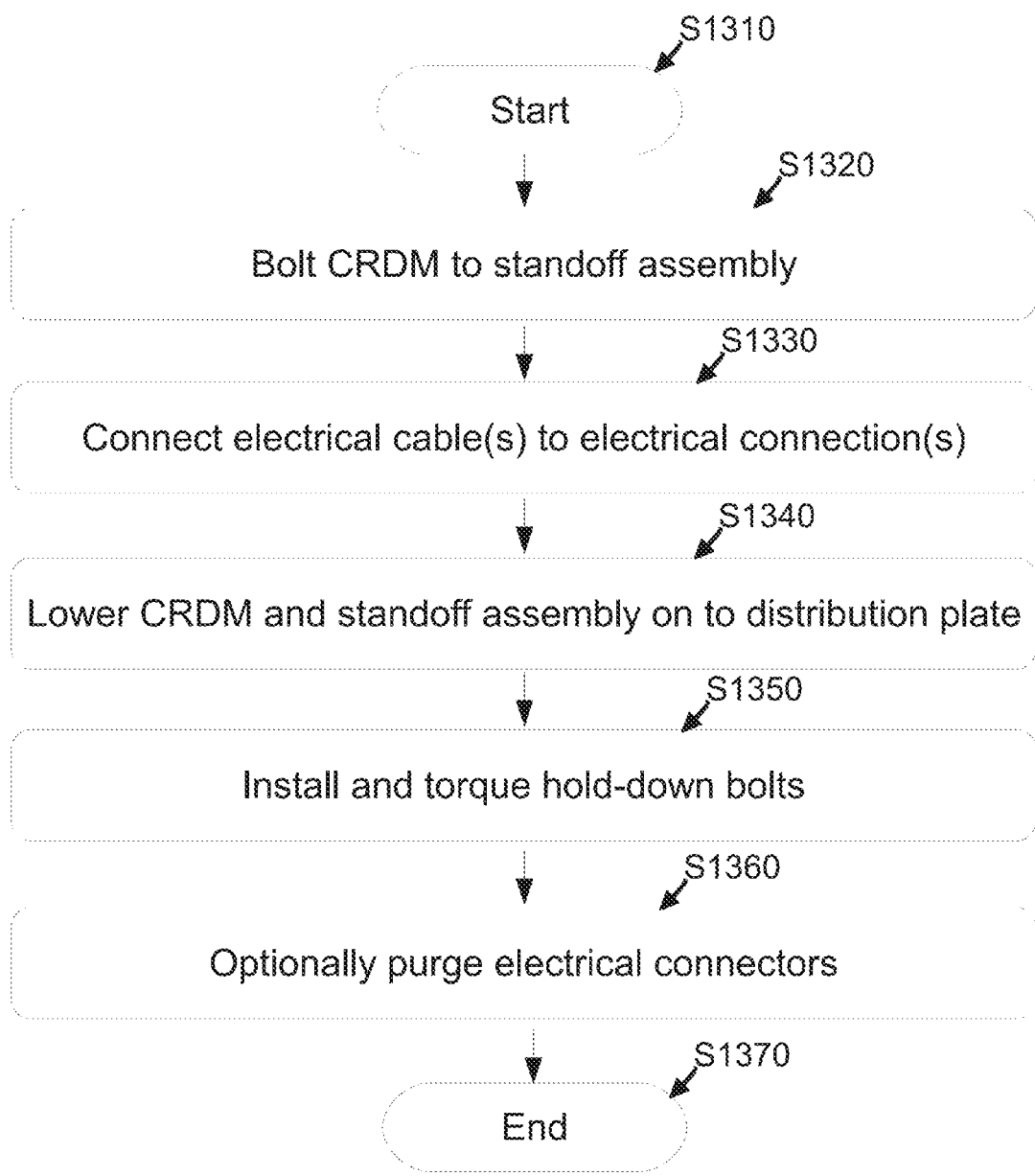
FIG. 13 illustrates a method of connecting a CRDM with standoff assembly to a distribution plate.

FIG. 13 diagrammatically illustrates a method of connecting a CRDM to a standoff to form a preassembled CRDM/standoff assembly and then connecting the CRDM/standoff assembly to the distribution plate. In step S1310, the method starts. In step S1320, the CRDM is bolted to the standoff assembly by a plurality of bolts. In step S1330, the electrical cable(s) are connected the electrical connection(s). In step S1340, the standoff plate, with CRDM bolted on top of it, is lowered onto the distribution plate, with the bolt holes 50 making contact first to ensure proper alignment of the standoff assembly and CRDM. In step S1350, the hold-down bolts are installed and torqued to attach the standoff assembly to the distribution plate and to ensure positive contact in the hydraulic and electrical connectors. At step S1360, the electrical connectors are optionally purged. At step S1370, the method ends.

Figure 14:
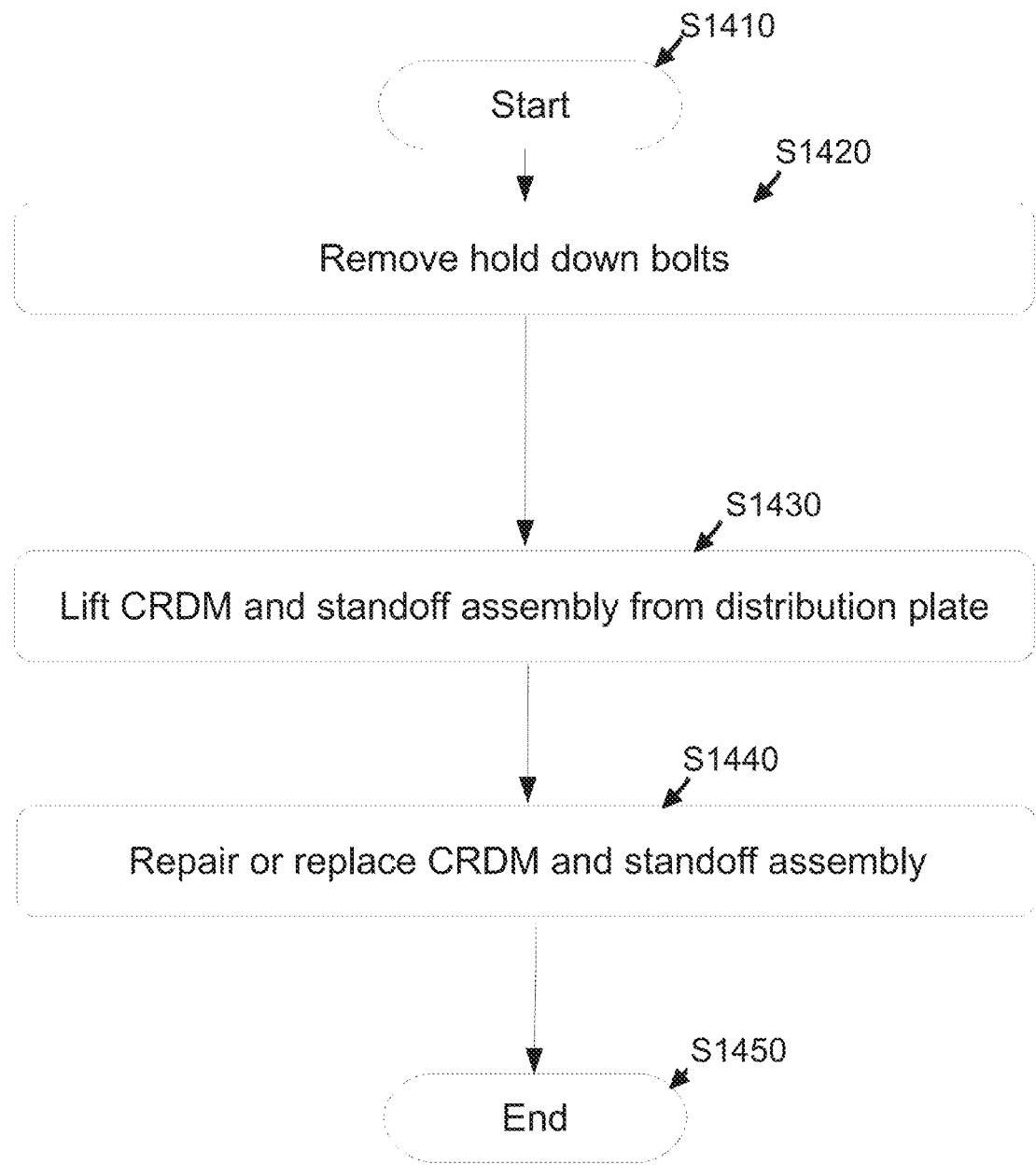
FIG. 14 illustrates a method of removing a CRDM and standoff assembly from a distribution plate.

FIG. 14 illustrates a method of removing a CRDM from a distribution plate. In step S1410, the method starts. In step S1420, the hold-down bolts are removed. In step S1430, the CRDM and connected standoff assembly are lifted away from the distribution plate. In step S1440, the CRDM is optionally removed from the standoff assembly for repair or replacement. In step S1450, the method ends.

The disclosed approaches advantageously improve the installation and servicing of powered internal mechanical reactor components (e.g., the illustrative CRDM/standoff assembly) by replacing conventional in-field installation procedures including on-site routing and installation of power lines (e.g. MI cables or hydraulic lines) and connection of each power line with the powered internal mechanical reactor component with a simple "plug-and-play" installation in which the power lines are integrated with the support plate and power connections are automatically made when the powered internal mechanical reactor component is mounted onto its support plate. Wet mating is enabled by the use of sealed male and female connectors and optional purging of space between the joined male and female connectors. The disclosed approaches leverage the fact that most powered internal mechanical reactor components are conventionally mounted on a support plate in order to provide sufficient structural support and to enable efficient removal for servicing (e.g., a welded mount complicates removal for servicing). By modifying the support plate to also serve as a power distribution plate with built-in connectors that mate with mating connectors of the powered internal mechanical reactor component during mounting of the latter, most of the installation complexity is shifted away from the power plant and to the reactor manufacturing site(s).

The example of FIGS. 1-14 is merely illustrative, and numerous variations are contemplated. For example, the CRDM/standoff assembly can be replaced by a CRDM with an integral mounting flange, that is, the standoff can be integrally formed with the CRDM as a unitary element (variant not shown).

Figure 15:
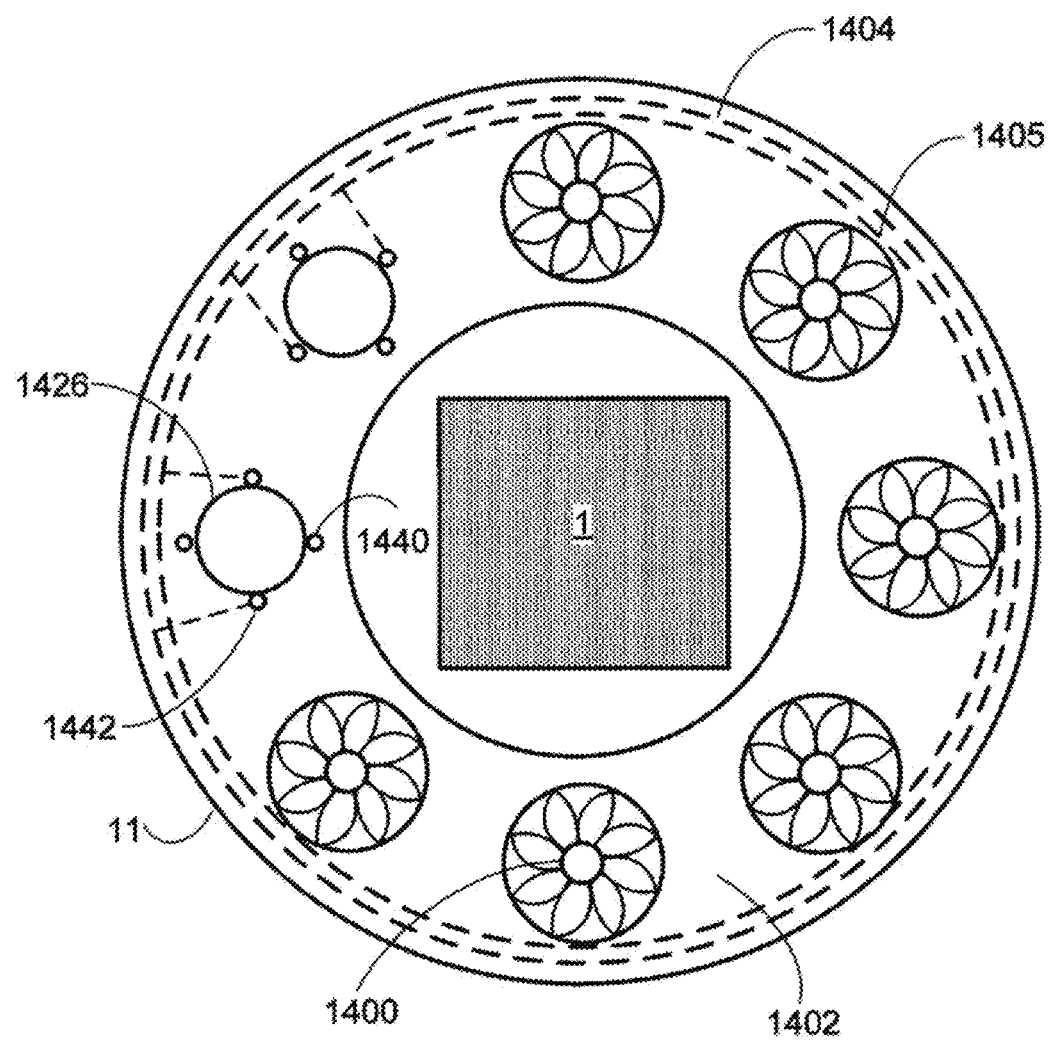
FIG. 15 diagrammatically shows an overhead view of a pump plate with internal reactor coolant pumps (RCP's) mounted in most openings.
Figure 16:
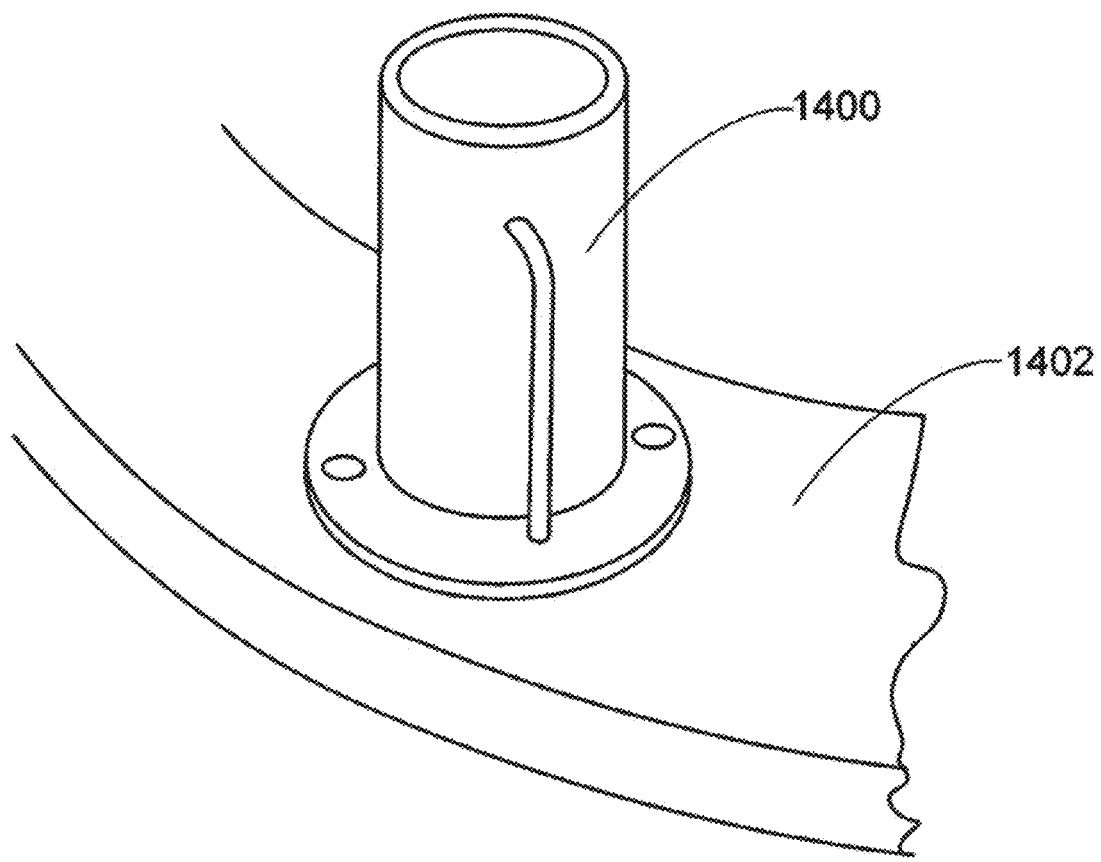
FIG. 16 diagrammatically shows a perspective view of one of the RCPs of FIG. 15.

With reference to FIGS. 15 and 16, as another illustrative example the disclosed approaches are applied to internal reactor coolant pumps (RCPs) 1400, such as are disclosed in Thome et al., U.S. Pub. No. 2010/0316181 A1 published Dec. 16, 2010 which is incorporated herein by reference in its entirety. For placement of the internal RCPs 1400 in the cold leg (i.e. the downcomer annulus), the RCPs 1400 are envisioned to be mounted on an annular pump plate 1402 disposed in the downcomer annulus. The pump plate 1402 serves as structural support for the RCPs 1400 and also as a pressure divider to separate the upper suction volume and the lower discharge volume. In the illustrative embodiment there are eight connection sites with six of these shown in FIG. 14 as containing RCPs 1400, and the remaining two being unused to illustrate the connection sites. The pump plate 1402 is modified to include MI cables 1404, 1405 disposed in or on the pump plate 1402. The annular shape of the pump plate 1402 precludes long straight runs of MI cable; however, the illustrative MI cables 1404, 1405 are oriented circumferentially with a large bend radius comparable with (half of) the inner diameter of the pressure vessel 11. Bolt apertures 1440 and electrical connectors 1442 are analogous to bolt apertures 40 and electrical connectors 42 of the illustrative CRDM embodiment, respectively. The opening 26 of the connection site of distribution plate 22 translates in the pump plate 1402 to be a generally circular opening 1426 (optionally keyed by a suitable keying feature, not shown) through which the RCPs 1400 pump primary coolant downward.

As yet another contemplated modification, it will be appreciated that the female connector can be located in the supporting power distribution plate while the male connector can be located in the flange, standoff or other mounting feature of the internal mechanical reactor component.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. An apparatus comprising:
   a nuclear reactor including a pressure vessel and a nuclear reactor core comprising fissile material disposed in the pressure vessel;
   an internal control rod drive mechanism (CRDM) including an electric motor disposed in the pressure vessel and a support surface including sealed electrical connectors electrically connected with the electric motor to deliver electrical power to the electrical motor; and
   a support element secured entirely within the pressure vessel which abuts the support surface of the internal CRDM and supports the internal CRDM in the pressure vessel, the support element being configured to be submerged in primary coolant and including sealed electrical connectors mating with the sealed electrical connectors on the support surface of the internal CRDM to deliver electrical power to the electric motor of the internal CRDM.

2. The apparatus of claim 1 wherein the internal CRDM further comprises:

mineral insulated cables (MI cables) electrically connecting the electric motor to the sealed electrical connectors on the support surface, wherein each MI cable is connected to one of the sealed electrical connectors and the sealed electrical connectors are sealed glass connectors, sealed ceramic connectors, or sealed glass ceramic connectors.

3. The apparatus of claim 1 wherein the internal CRDM further comprises:

mineral insulated cables (MI cables) electrically connecting the electric motor to the sealed electrical connectors on the support surface, wherein each MI cable is connected to one of the sealed electrical connectors and the sealed electrical connectors are welded onto the ends of the MI cables.

4. The apparatus of claim 1 further comprising:

springs disposed between the sealed electrical connectors of the support element and the mating sealed electrical connectors on the support surface of the internal CRDM.

5. The apparatus of claim 4 wherein the springs are wave springs.

6. The apparatus of claim 1 further comprising:

a purge line integrated with each mated connection of a sealed electrical connector of the support element and the mated sealed electrical connector on the support surface of the internal CRDM, wherein the purge line defines a conduit from the exterior of the sealed electrical connector on the support surface to an area between the sealed electrical connector on the support surface and the sealed electrical connector of the support element in the mated connection.

7. The apparatus of claim 1 wherein the internal CRDM includes a standoff mechanically secured with the internal CRDM, the support surface of the internal CRDM being a surface of the standoff.

8. The apparatus of claim 1 wherein the support element comprises:

a distribution plate including mineral insulated cables (MI cables) disposed on or in the distribution plate and terminating at the sealed electrical connectors of the distribution plate.

9. The apparatus of claim 1, where the sealed electrical connectors of the support surface of the internal CRDM are female electrical connectors, and the electrical connectors of the support element are male electrical connectors.

10. The apparatus of claim 1, where the sealed electrical connectors of the support surface of the internal CRDM are male electrical connectors, and the electrical connectors of the support element are female electrical connectors.

* * * * *